(12) United States Patent
Holtzman

(10) Patent No.: US 9,352,195 B2
(45) Date of Patent: May 31, 2016

(54) BOWLING BALL WEIGHING APPARATUS

(71) Applicant: Barry Lyn Holtzman, Eagle River, WI (US)

(72) Inventor: Barry Lyn Holtzman, Eagle River, WI (US)

( * ) Notice: Subject to any disclaimer, the term of this patent is extended or adjusted under 35 U.S.C. 154(b) by 162 days.

(21) Appl. No.: 14/120,650

(22) Filed: Jun. 11, 2014

(65) Prior Publication Data
US 2015/0360087 A1 Dec. 17, 2015

(51) Int. Cl.
G01M 1/14 (2006.01)
A63B 47/00 (2006.01)
G01B 5/00 (2006.01)
A63B 37/00 (2006.01)

(52) U.S. Cl.
CPC ............ *A63B 47/008* (2013.01); *G01B 5/0023* (2013.01); *G01M 1/14* (2013.01); *A63B 37/0001* (2013.01); *A63B 2220/52* (2013.01)

(58) Field of Classification Search
CPC ............ A63B 37/0001; A63B 37/008; A63B 47/008; A63B 2220/52; G01M 1/10; G01M 1/12; G01M 1/122; G01M 1/14; G01G 21/14; G01G 21/22; G01B 5/0023
See application file for complete search history.

(56) References Cited

U.S. PATENT DOCUMENTS

| | | | | |
|---|---|---|---|---|
| 995,109 A * | 6/1911 | Bassett | ............ | G01M 1/12 177/247 |
| 1,099,917 A * | 6/1914 | Dungan | ............ | G01M 1/12 73/482 |
| 3,029,521 A * | 4/1962 | Estopare | ............ | A63B 37/0001 33/391 |
| 3,156,067 A * | 11/1964 | Malko | ............ | A63B 47/00 73/483 |
| 3,570,278 A * | 3/1971 | Lannen | ............ | G01M 1/12 73/483 |
| 4,233,846 A * | 11/1980 | Taylor | ............ | G01M 1/16 73/460 |
| 4,407,154 A * | 10/1983 | Hardman | ............ | G01M 1/12 73/480 |
| 4,742,620 A * | 5/1988 | Manker | ............ | A63B 37/0001 33/21.2 |
| 5,367,129 A * | 11/1994 | Lahl, Jr. | ............ | A63B 47/008 177/229 |
| 5,603,165 A * | 2/1997 | Bernhardt | ............ | G01B 5/0023 33/509 |

\* cited by examiner

*Primary Examiner* — Peter Macchiarolo
*Assistant Examiner* — Natalie Huls

(57) ABSTRACT

In accordance with one embodiment, a bowling ball weighing apparatus comprises a weight scale and a bowling ball support assembly. The apparatus comprises a ball support assembly and a weight scale. The ball support assembly has a cradle which holds the bowling ball and the assembly has weight supports. Whenever the scale is read, one of these weight supports is supported by the scale and another is supported apart from the scale. In a first orientation of the bowling ball with a first hemisphere of the ball closer to the weight support supported by the scale, a first scale reading is determined. Then in a second orientation with the first hemisphere of the ball farther from the weight support supported by the scale, a second scale reading is determined. Comparison of the two scale readings allows determination of the weight imbalance of the ball's two hemispheres. This weighing apparatus is able to use a single, readily available commercial scale, making it low in cost to produce, and the use of an electronic weight scale allows fast, accurate readings.

19 Claims, 4 Drawing Sheets

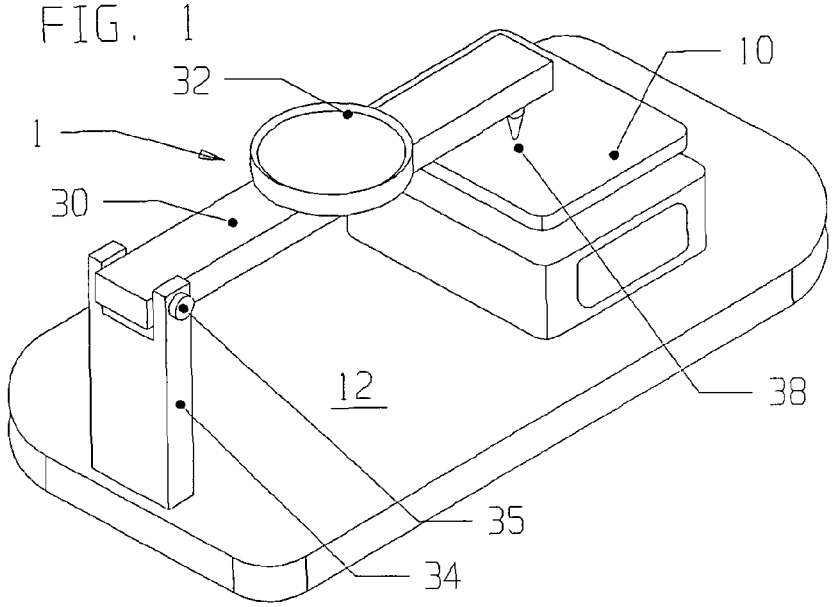
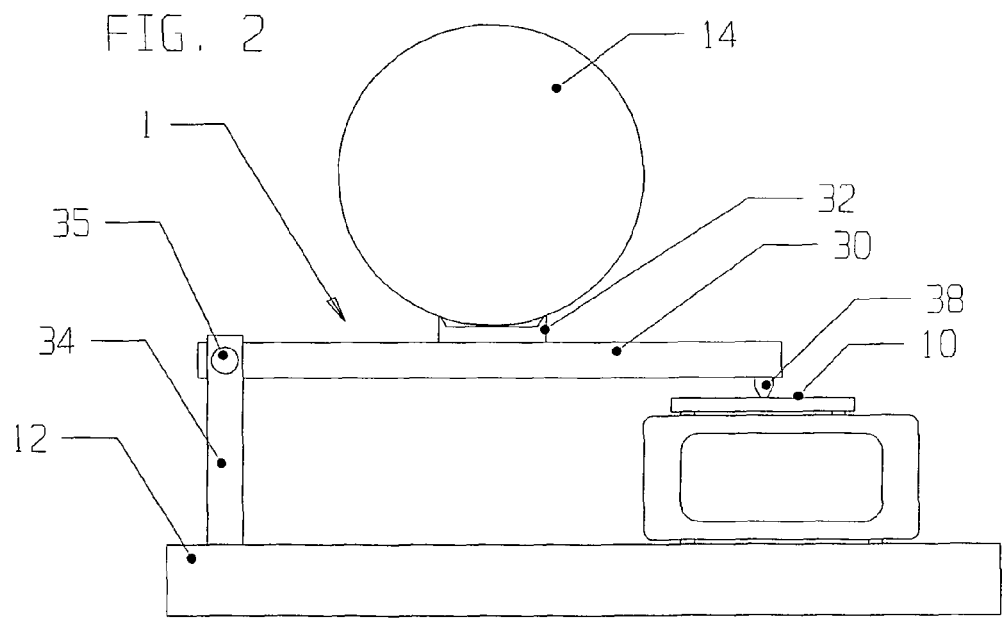

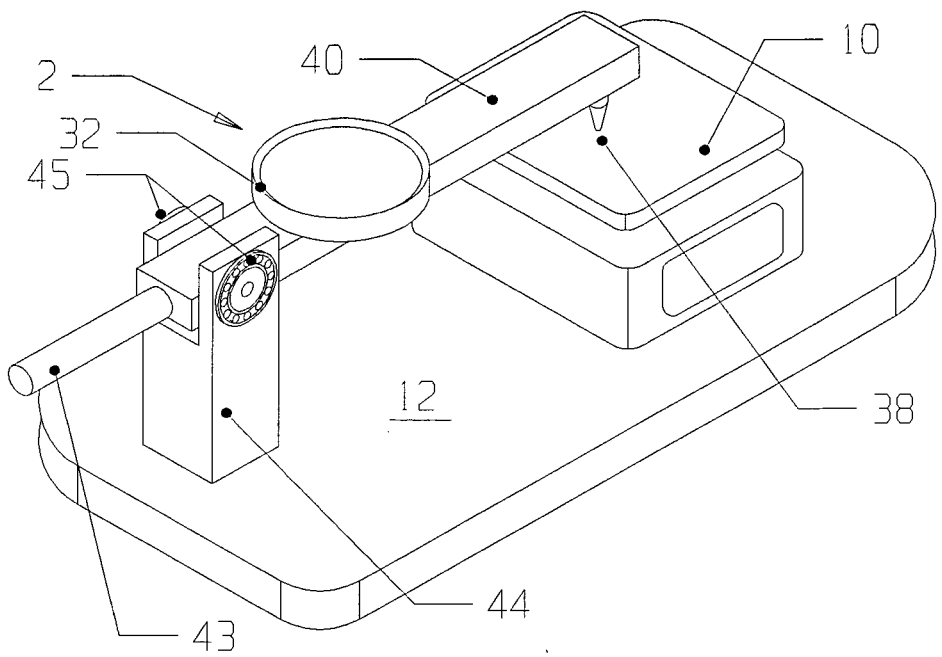
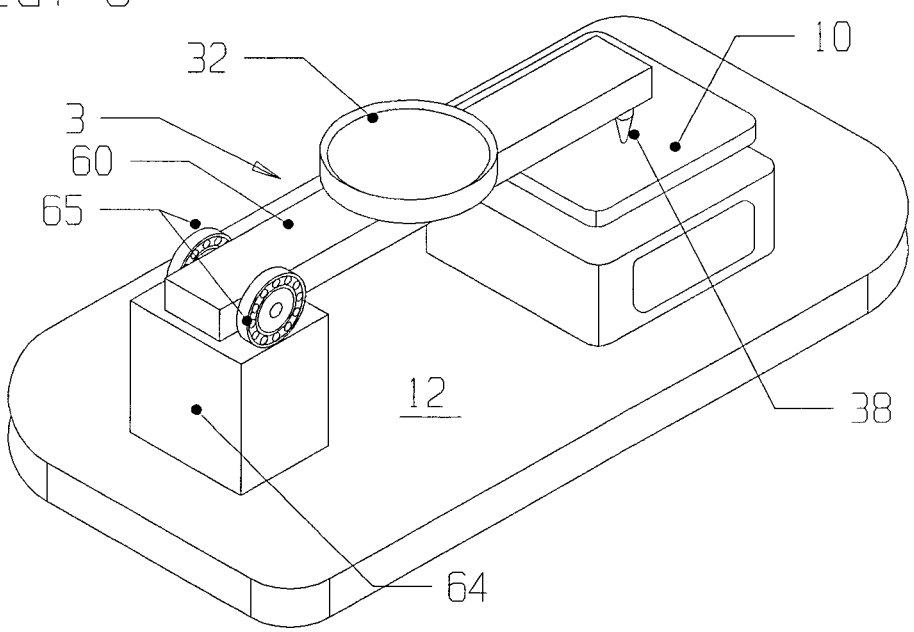

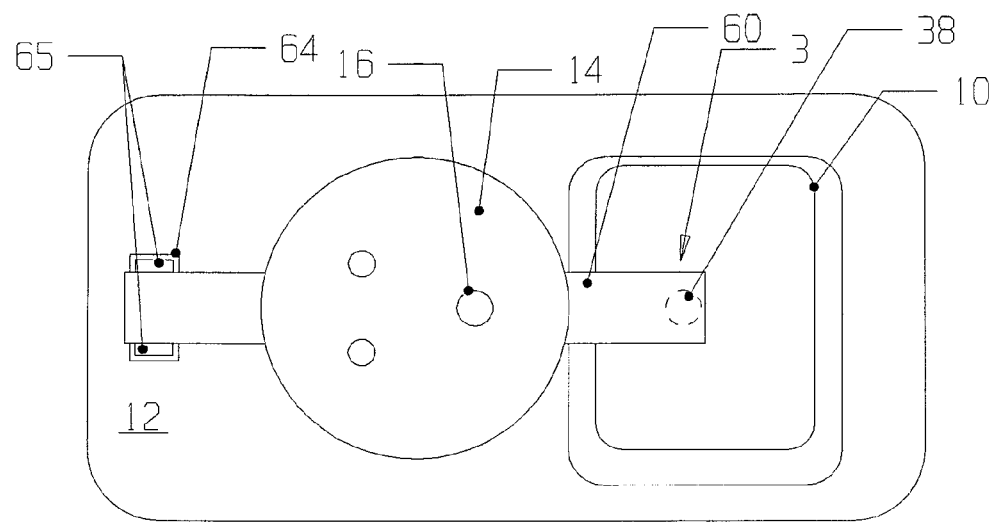
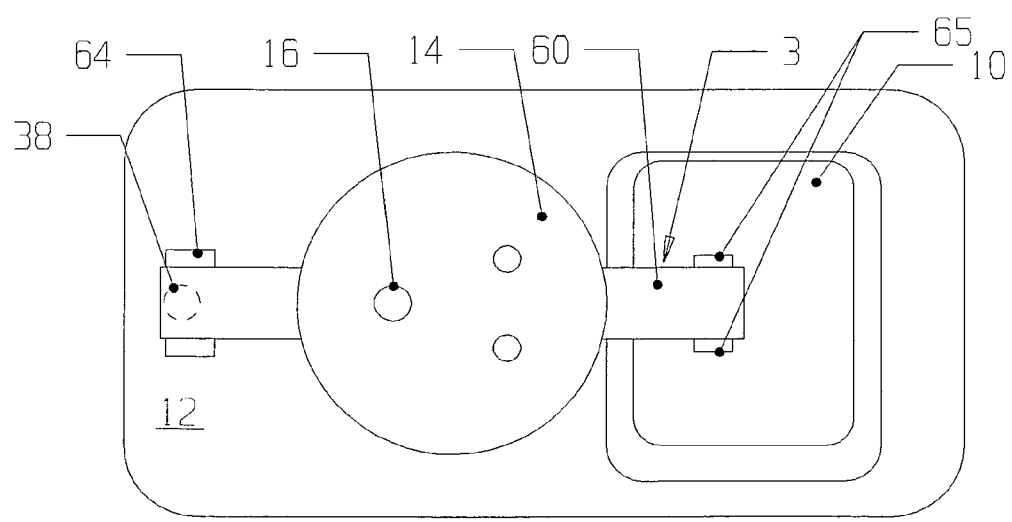

BOWLING BALL WEIGHING APPARATUS

CROSS REFERENCE TO RELATED APPLICATIONS

Not Applicable

FEDERALLY SPONSORED RESEARCH OR DEVELOPMENT

Not Applicable

SEQUENCE LISTING, TABLE, OR PROGRAM

Not Applicable

BACKGROUND

1. Field

This application relates to a bowling ball weighing apparatus which provides information about a bowling ball's weight imbalance.

2. Prior Art

Bowling balls can have a mass imbalance between two opposite hemispheres caused by the hemispheres having different masses and/or mass distributions, and this mass imbalance results in a weight imbalance between the two hemispheres. A mass imbalance can be established during manufacturing due to normal manufacturing tolerances or it can be intentionally manufactured into a ball to improve its performance. Also, after a ball is manufactured, it is normally drilled with finger holes, and this will change the ball's as-manufactured mass distribution. The United States Bowling Congress (USBC) has put limits on the allowable weight imbalance of a bowling ball. The rules are a bit complicated, but basically a ball must have its weight imbalance analyzed in three specific orientations, and the weight imbalance of the opposite hemispheres of these orientations must be less than a prescribed maximum value for each orientation.

What is actually being measured when determining weight imbalance is a torque resulting from a mass imbalance; an equivalent mass imbalance times a moment arm. A weight imbalance between a ball's two opposite hemispheres divided by a vertical plane applies a torque about a horizontal axis which lies in the vertical plane and passes through the bowling ball's center, and by custom, one ounce of weight imbalance is equivalent to 3.294 ounce-inches of torque about this axis.

A tool commonly used to determine a bowling ball's weight imbalance is called a dodo weight scale, or dodo balance beam weight scale. It has a ball cradle which can hold a bowling ball in any rotational orientation, it has primary and secondary balance beams, and it has a single pivot point which supports all the weight of the ball, balance beams, ball cradle, and support frame. A ball is placed in the dodo scale's cradle in an orientation specified by the USBC, and with the secondary balance beam set in its zero position, the primary beam is balanced. The ball is then rotated 180 degrees about a vertical axis through its center and the secondary beam is adjusted to again achieve balance. The weight imbalance of the ball's two hemispheres is the reading of the secondary balance beam, and this must be less than that allowed by the USBC for that particular ball orientation. This procedure is repeated two more times in two other USBC specified ball orientations. This dodo balance beam scale requires two balance beams, or essentially two weight scales, for its operation and as stated above, all the weight of the ball is supported at one pivot point.

Another apparatus used to determine a bowling ball's weight imbalance uses two or more electronic load cells to measure a ball's imbalance, and this apparatus is described in U.S. Pat. No. 5,367,129 to Lahl (1994). In this apparatus, a bowling ball is placed in a locating ring which is ultimately supported by two or more electronic load cells. Weight imbalance is determined by comparing the readings of these load cells. This apparatus requires an electronic scale specially designed for this purpose, having two or more load cells with a specially designed load cell analysis routine to determine a bowling ball's weight imbalance. Here again, this apparatus requires the use of two or more weight scales (two or more load cells) for its operation, with portions of the ball's weight supported by each of the scales.

It is desirable to have a bowling ball weighing apparatus which uses a single, commercially available weight scale along with a bowling ball support assembly to determine a bowling ball's weight imbalance.

SUMMARY

Several embodiments are presented of a bowling ball weighing apparatus comprising a weight scale and a bowling ball support assembly. The support assembly comprises a ball cradle mounted to a frame with two weight supports. A single weight scale is sufficient to establish the bowling ball's weight imbalance using this apparatus.

DRAWINGS- BRIEF DESCRIPTION

FIG. 1 shows a perspective view of a first embodiment of a bowling ball weighing apparatus of this invention, FIG. 2 shows a side view of this embodiment holding a bowling ball.

FIG. 5 shows a perspective view of a second embodiment of this bowling ball weighing apparatus.

FIG. 6 shows a perspective view of a third embodiment of this apparatus and

FIGS. 7 and 8 show top views of this embodiment holding a bowling ball.

DRAWINGS-REFERENCE NUMERALS

Figure 3:
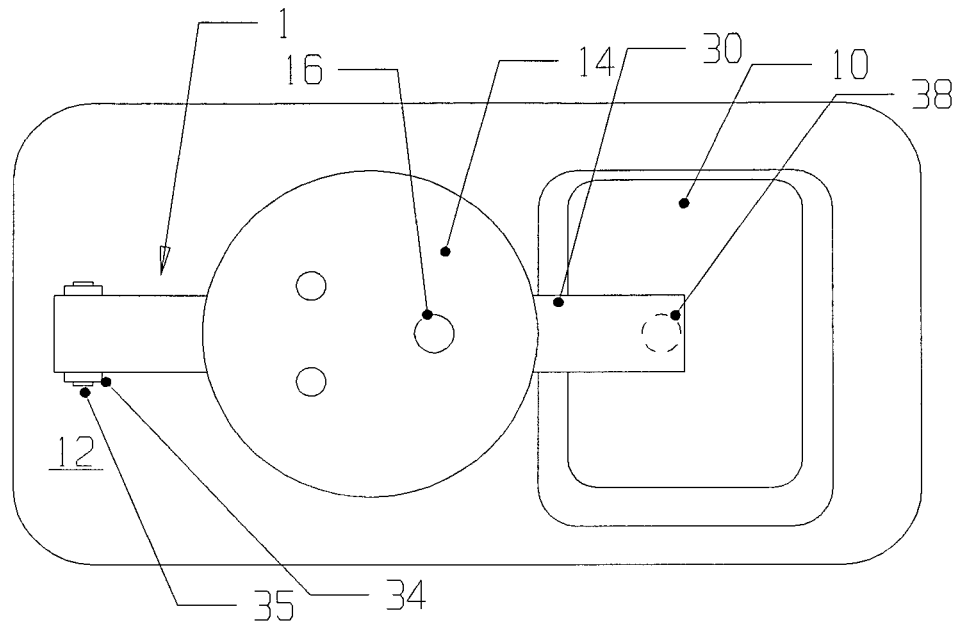
FIGS. 3 and 4 show top views of this embodiment holding the bowling ball in two different orientations.
Figure 4:
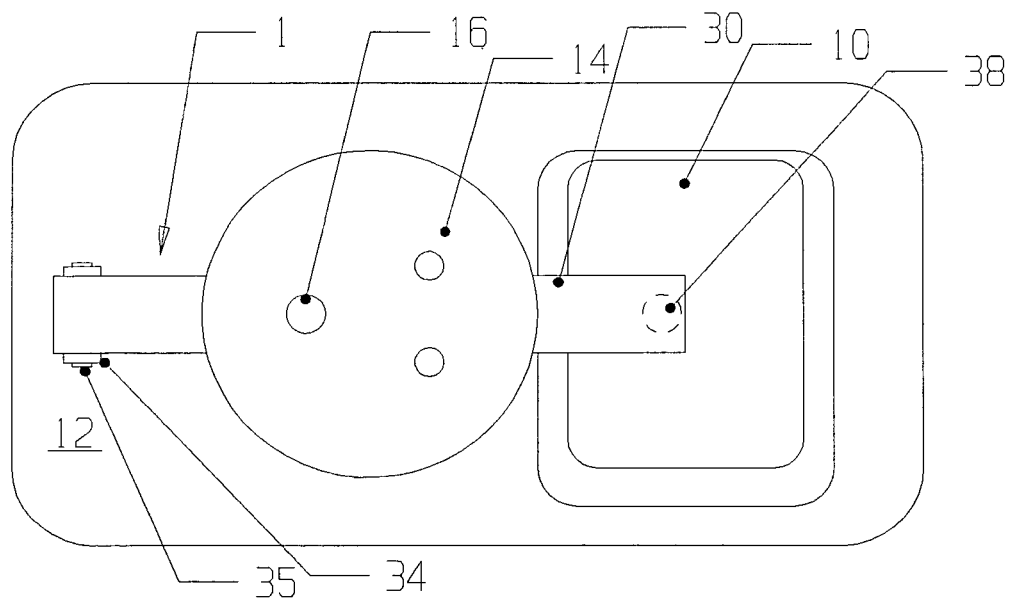

1 bowling ball support assembly, first embodiment
2 bowling ball support assembly, second embodiment
3 bowling ball support assembly, third embodiment
10 weight scale
12 support plate
14 bowling ball
16 bowling ball thumb hole
30 beam, first embodiment
32 ball cradle, first, second, and third embodiments
34 pillar for first weight support, first embodiment
35 pin for first weight support, first embodiment
38 projection for second weight support, first, second, and third embodiments
40 beam, second embodiment
43 counterweight
44 pillar for first weight support, second embodiment
45 bearings for first weight support, second embodiment
60 beam, third embodiment
64 pillar for first weight support, third embodiment 65 bearings for first weight support, third embodiment Description FIGS. 1, 2, 3 and 4—Bowling Ball Weighing Apparatus, First Embodiment FIG. 1 shows a first embodiment of a bowling ball weighing apparatus of this invention. This embodiment comprises a bowling ball support assembly 1 and a weight scale 10, both contacting a support plate 12. Ball support assembly 1 has as its frame a beam 30, and it further comprises a ball cradle 32, a first weight support provided by a pillar 34 and a pin 35, and a second weight support provided by a projection 38. FIG. 2 shows a side view of this first embodiment holding a bowling ball 14. FIG. 3 shows a top view of the first embodiment holding bowling ball 14 in a first orientation with a thumb hole 16 to the right of center. FIG. 4 shows ball 14 in a second orientation with thumb hole 16 to the left of center. The second orientation is obtained from the first by rotating ball 14 relative to assembly 1 through 180 degrees about a vertical axis through the center of ball 14.

In this first embodiment, ball cradle 32 is shown in FIGS. 1,2,3, and 4 as being approximately centered between pin 35 and projection 38, resulting in approximately half the weight of ball 14 being supported by pillar 34 and half supported by scale 10. Cradle 32 can be fixed to beam 30 requiring rotation of ball 14 in cradle 32 to obtain different rotational orientations with respect to assembly 1. Cradle 32 can be allowed to rotate on beam 30 using a bearing mechanism (not shown) which would allow different ball 14 orientations to be achieved by a rotation of cradle 32. Stability of assembly 1, especially with ball 14 resting on it, is improved if pillar 34 is fixed to plate 12 (rather than just resting on plate 12). In this case, it is desirable that pin 35 allow rotation of beam 30 with respect to pillar 34, thus preventing pillar 34 from exerting a torque on beam 30 which would affect the reading of scale 10.

A novel feature of this invention is that assembly 1 has a first weight support supported "solidly" by pillar 34 and pin 35 apart from scale 10 and a second weight support supported by scale 10 through projection 38. Use of the "solid" first weight support eliminates the need for a second weight measuring device (balance beam, load cell, etc.) to obtain a weight imbalance of ball 14. Pillar 34 and pin 35, the first weight support for assembly 1, can be considered as a pivot point about which a torque from the weight of ball 14, a torque from the weight of assembly 1, and a torque from scale 10 through projection 38, the second weight support, are applied. The torque arms of these weights lie along a line which connects the effective bearing points of the first weight support provided by pillar 34 and pin 35 and the second weight support provided by projection 38 resting on scale 10. If the first and second weight supports are symmetrical with beam 30 as shown, then the torque arms of the above weights around the first weight support lie on a line parallel with the long dimension of beam 30.

It is important to note that what is being measured is a torque resulting from a weight imbalance of two hemispheres of ball 14. These two hemispheres are divided by a "centered perpendicular vertical plane" which is a vertical plane which passes through the center of ball 14 and which is also perpendicular to the "torque arm" provided by assembly 1; it is perpendicular to the cross section of beam 30. The weight imbalance of these two hemispheres of ball 14 applies a torque about a horizontal axis passing through the center of ball 14 and which lies in the centered perpendicular vertical plane.

Scale 10 can be a commercially available weight scale, such as a scale which uses a spring and pointer means to determine weight, it can be a balance beam scale, or it can be an electronic scale with or without a zeroing function. If scale 10 does not have a zeroing function, scale 10 readings can simply be recorded and subtracted. It is to be noted that if scale 10 is electronic, it may employ multiple electronic load cells to determine weight. Electronic scales typically have four load cells located in the four corners of their weight pan to avoid the need for centering the item to be weighed in the weight pan. The weight readout is determined by adding the readings of the load cells. But only one weight reading, whether provided by one electronic load cell or by the addition of multiple load cells, is required by this invention to obtain the weight imbalance of a bowling ball. For the operation of this invention it is not necessary to obtain the readings of multiple weight scales or multiple load cells.

The operating procedure for this first embodiment is to place bowling ball 14 in a first orientation in cradle 32, such as shown in FIG. 3, and then to determine a scale 10 reading, for instance by zeroing scale 10. Then ball 14 is rotated with respect to assembly 1 by 180 degrees about a vertical axis through its center to a second orientation, such as shown in FIG. 4, either by rotating ball 14 in cradle 32 or by rotating cradle 32. The reading of scale 10 in the second orientation of ball 14 provides information about its weight imbalance in these two orientations. If the scale 10 readings in the two orientations are equal, this indicates approximately no weight imbalance. If the reading on scale 10 in the second orientation is greater than the reading in the first, this means the hemisphere of ball 14 closer to scale 10 in the second orientation is heavier than the hemisphere farther from scale 10. If the reading on scale 10 in the second orientation is less than the reading in the first, the opposite is true. To convert weight imbalance to torque in this weighing apparatus, the torque on bowling ball 14 about a horizontal axis passing through the center of ball 14 and which lies in the perpendicular vertical centered plane between the two measured ball 14 hemispheres equals the measured weight imbalance multiplied by half the horizontal distance between the effective bearing points of the first and second weight supports, namely by half the distance between the center of pin 35 and the center of projection 38.

FIG. 5-Bowling Ball Weighing Apparatus Second Embodiment

FIG. 5 shows a second embodiment of a bowling ball weighing apparatus of this invention. This embodiment has a bowling ball support assembly 2 which has as its frame a beam 40, and it further comprises ball cradle 32, a counterweight 43, a first weight support comprising pillar 44 and two bearings 45, and a second weight support which is projection 38 supported by scale 10. In this embodiment, cradle 32 is shown as being closer to the center of bearing 45 than to projection 38 (instead of the centering shown in the first embodiment) resulting in a condition in which a bowling ball placed in cradle 32 will have a greater percentage of its weight supported by the first weight support than that which is supported by the second weight support which is supported by scale 10. Also, counterweight 43 is affixed to the end of beam 40 away from scale 10 which applies a torque about bearing 45 which further reduces the weight carried by scale 10. It turns out that this embodiment will function as the first embodiment in that the same formula relating torque and weight imbalance applies. But a potential reason for using this embodiment, or other embodiments which use this or other cradle 32 positioning and counterweight 43 principles, is to allow the use of scale 10 having a desired capacity. For instance it may be desirable in some cases to use a scale 10 with a relatively low weight capacity because scales 10 with smaller capacity can inherently have greater accuracy and/or improved readability. The position of cradle 32 on beam 40 in this second embodiment and/or the use of counterweight 43 would allow the use of a lower weight capacity scale 10 than that which could be used in the first embodiment. Conversely, cradle 32 could be moved farther from pin 35 and/or counterweight 43 could be affixed to the end of beam 40 which is closer to projection 38, thus resulting in relatively more weight applied to scale 10.

Another feature of this embodiment is the use of bearings 45 in this embodiment's first weight support instead of pin 35 in the first embodiment. In these measuring apparatuses, the requirement to measure very small differences in forces means that friction is generally not a friend. The use of bearings 45 can reduce the friction in the pivoting mechanism of the first weight support over a pin 35, thus insuring accuracy in measurement.

FIGS. 6, 7 and 8-Bowling Ball Weighing Apparatus Third Embodiment

FIG. 6 shows a third embodiment of a bowling ball weighing apparatus of this invention. This embodiment has a bowling ball support assembly 3 and again weight scale 10 both contacting plate 12. Support assembly 3 has a frame which is a beam 60 and it further comprises ball cradle 32, a first weight support provided by a couple of bearings 65 resting on a pillar 64, and a second weight support provided by projection 38. FIGS. 7 and 8 show top views of this embodiment holding bowling ball 14 in two orientations with respect to scale 10.

The primary difference in operation of this third embodiment compared to the first two is in the manner in which different orientations of ball 14 with respect to scale 10 are achieved. In the first two embodiments, ball 14 was rotated relative to their ball support assemblies 1 and 2 to achieve different ball 14 orientations with respect to scale 10. But in this third embodiment, ball 14 is not rotated with respect to assembly 3, but ball 14 is left stationary with respect to assembly 3 and assembly 3 (along with ball 14) is rotated to present opposite hemispheres of ball 14 to scale 10.

In this embodiment, if some design principles are adhered to, simple operation and measurement is allowed. First of all, projection 38 and bearings 65 should project the same distance below beam 60, and pillar 64 should be approximately the same height as scale 10. Cradle 32 should be centered between the centers of bearings 65 and projection 38. Also, all the parts of assembly 3 which are rotated should be weight balanced with respect to the center of rotation, which in this case is the center of cradle 32.

Operation of this third embodiment is as follows. FIG. 7 shows a first orientation of ball 14 with its thumb hole 16 to the right of center, closer to scale 10. FIG. 7 also shows bearings 65 sitting on pillar 64 and (hidden) projection 38 resting on scale 10. A reading of scale 10 in this first orientation is determined or scale 10 can be zeroed. FIG. 8 shows a second orientation of ball 14 wherein thumb hole 16 is to the left of center, away from scale 10, and now bearings 65 and projection 38 have switched positions with bearings 65 sitting on scale 10 and (hidden) projection 38 resting on pillar 64. This change in orientation of ball 14 with respect to scale 10 is obtained by simply picking up assembly 3 and, without moving ball 14 with respect to assembly 3, rotating assembly 3 (and ball 14) through 180 degrees so bearings 65 and projection 38 switch places. A second reading of scale 10 is determined with ball 14 in this second orientation and a weight imbalance of ball 14 is obtained by comparing the first scale 10 reading to the second. Here again, the same formula relating weight imbalance to torque applies as in the first two embodiments, namely the torque on ball 14 equals the measured weight imbalance multiplied by half the horizontal distance between the centers of bearings 65 and projection 38.

CONCLUSION, RAMIFICATIONS, AND SCOPE

Accordingly, the reader will see that the bowling ball weighing apparatus described can provide information about a weight imbalance of a bowling ball. The apparatus comprises a ball support assembly and a weight scale. The ball support assembly has a cradle which holds the bowling ball and the assembly has weight supports. Whenever the scale is read, one of these weight supports is supported by the scale and another is supported apart from the scale. In a first orientation of the bowling ball with a first hemisphere of the ball closer to the weight support supported by the scale, a first scale reading is determined. Then in a second orientation where the first hemisphere of the ball is farther from the weight support supported by the scale, a second scale reading is determined. Comparison of the two scale readings allows a determination of the weight imbalance of the ball's two hemispheres. This weighing apparatus is able to use a single, readily available commercial scale, making it low in cost to produce, and the use of an electronic weight scale allows fast, accurate readings.

Although the description above contains many specificities, these should not be construed as limiting the scope of the invention but as merely providing illustrations of several embodiments. The scope of the invention should be determined by the appended claims and their legal equivalents rather than by the examples given.

I claim:

1. An apparatus used to measure a weight imbalance of a bowling ball, the apparatus comprising:
   a weight scale,
   and a bowling ball support assembly comprising a ball cradle, first and second weight supports, and a frame which connects the ball cradle to the weight supports,
   wherein a portion of the bowling ball and bowling ball support assembly is supported by one of the weight supports which is in turn supported and measured by the weight scale and another portion of the bowling ball and support assembly is supported by the other weight support which is in turn supported apart from the weight scale,
   wherein, with the bowling ball in a first orientation with respect to the weight scale, a first weight scale reading is determined, and with the bowling ball in a second orientation with respect to the weight scale, a second weight scale reading is determined,
   whereby the apparatus provides information about a weight imbalance of the bowling ball by comparing the first weight scale reading to the second.

2. The apparatus of claim 1 wherein the weight scale is electronic.

3. The apparatus of claim 2 wherein the weight scale has a zeroing function.

4. The apparatus of claim 1 wherein the first and second weight supports deliver torques to the bowling ball support assembly through a lever arm, and wherein the apparatus determines weight imbalance between two hemispheres of the bowling ball divided by a vertical plane through the bowling ball's center and which is substantially perpendicular to the lever arm.

5. The apparatus of claim 4 wherein the first and second weight supports have symmetry with the frame whereby the lever arm has symmetry with the frame and whereby the apparatus determines weight imbalance between two hemispheres of the bowling ball divided by a vertical plane through the bowling ball's center and which is substantially perpendicular to the frame.

6. The apparatus of claim 1 wherein the ball cradle is substantially centered between the first weight support and the second weight support.

7. The apparatus of claim 1 wherein the first weight support is supported apart from the scale and the second weight support is supported by the weight scale when the bowling ball is in both orientations.

8. The apparatus of claim 7 wherein the bowling ball support assembly further comprises a support plate, the first weight support is affixed to the support plate, and the weight scale is sitting on the support plate.

9. The apparatus of claim 1 wherein the second orientation of the bowling ball is obtained by a rotation of the bowling ball with respect to the ball support assembly.

10. The apparatus of claim 9 wherein the bowling ball is rotated substantially 180 degrees about a vertical axis through the ball's center.

11. The apparatus of claim 1 wherein the second orientation of the bowling ball is obtained from the first orientation by a rotation of the ball cradle.

12. The apparatus of claim 1 wherein the second orientation of the bowling ball is obtained from the first by a rotation of the frame which holds the ball cradle.

13. The apparatus of claim 1 wherein a counterweight is affixed to the frame to adjust readings of the weight scale.

14. An apparatus used to measure weight imbalance of a bowling ball, the apparatus comprising:
a weight scale,
and a bowling ball support assembly configured to support a first portion of the bowling ball's weight on a first weight support which is supported apart from the weight scale and to support a second portion of the bowling ball's weight on a second weight support which is supported by the weight scale,
wherein, with the bowling ball in a first orientation with respect to the apparatus, a first weight scale reading is determined, and with the bowling ball in a second orientation with respect to the apparatus, a second weight scale reading is determined,
whereby the apparatus provides information about a weight imbalance of the bowling ball by comparing the first weight scale reading to the second.

15. The apparatus of claim 14 wherein the apparatus further comprises a support plate to which the first weight support is affixed and on which the weight scale sits.

16. A method for determining a weight imbalance of a bowling ball, comprising the steps of:
placing the bowling ball in a first orientation on an apparatus comprising a weight scale and a bowling ball support assembly, the bowling ball support assembly comprising a ball cradle, a first weight support which is supported apart from the weight scale, a second weight support which is supported by the weight scale, and a frame connecting the first weight support, the second weight support, and the ball cradle,
obtaining a first weight scale reading with the bowling ball in the first orientation on the apparatus,
placing the bowling ball in a second orientation on the apparatus,
obtaining a second weight scale reading with the bowling ball in the second orientation,
and determining information about the weight imbalance of the bowling ball by comparing the first weight scale reading to the second weight scale reading.

17. The method of claim 16 wherein the second orientation is obtained from the first by a rotation of the bowling ball about a vertical axis through its center of substantially 180 degrees.

18. The method of claim 16 wherein the frame has a beam to which the first and second weight supports are attached, the beam has an axis, the first and second weight supports have symmetry with the beam's axis, and the weight imbalance that is determined is the weight imbalance between two hemispheres of the bowling ball that are defined by a vertical plane which is substantially perpendicular to the beam's axis.

19. The method of claim 18 wherein the beam's axis is substantially horizontal when the first and second weight scale readings are determined.

* * * * *